(12) United States Patent
Kim et al.

(10) Patent No.: US 7,403,271 B2
(45) Date of Patent: Jul. 22, 2008

(54) OPTICAL FINGER PRINT INPUT DEVICE FOR MOBILE APPARATUS

(75) Inventors: Hyun Kim, Gyeonggi-do (KR); Young Jin Seo, Seoul (KR); Jong Woo Ahn, Seoul (KR); Seung Min Lee, Seoul (KR); Sa Hyang Hong, Seoul (KR); Tae Hun Lee, Gyeonggi-do (KR); Byung Kee Kwak, Daegu Metropolitan (KR)

(73) Assignee: Secutronix Inc., Seoul (KR)

( * ) Notice: Subject to any disclaimer, the term of this patent is extended or adjusted under 35 U.S.C. 154(b) by 179 days.

(21) Appl. No.: 10/591,853

(22) PCT Filed: Sep. 14, 2004

(86) PCT No.: PCT/KR2004/002327

§ 371 (c)(1),
(2), (4) Date: Sep. 5, 2006

(87) PCT Pub. No.: WO2005/086077

PCT Pub. Date: Sep. 15, 2005

(65) Prior Publication Data

US 2007/0189588 A1    Aug. 16, 2007

(30) Foreign Application Priority Data

Mar. 10, 2004    (KR) .................... 10-2004-0016187

(51) Int. Cl.
*G06K 9/74*    (2006.01)

(52) U.S. Cl. ........................................... 356/71

(58) Field of Classification Search ................ None
See application file for complete search history.

(56) References Cited

U.S. PATENT DOCUMENTS 5,109,427 A    4/1992    Yang
5,892,599 A    4/1999    Bahuguna

FOREIGN PATENT DOCUMENTS

| JP | 01-145642 | 6/1989 |
| JP | 05-006423 | 1/1993 |
| KR | 1020040042727 | 5/2004 |

*Primary Examiner*—Gregory J. Toatley, Jr.
*Assistant Examiner*—Amanda H Merlino
(74) *Attorney, Agent, or Firm*—John W. Renner; Renner, Otto, Boisselle & Sklar (57) ABSTRACT

An optical fingerprint image input device for a mobile apparatus includes: a plate-shaped fingerprint contact member; a distortion correcting member for correcting distortions; light sources disposed at both sides of the fingerprint contact member, other than an inclined surface or a back light source in a liquid crystal display element; focusing means disposed at an inclined surface side of the distortion correcting member; and an image sensor. In other words, the fingerprint contact member and the distortion correcting member having respective set-up inclined angles are disposed to discern sweat, water or oil and to correct a trapezoidal distortion which is a disadvantage that occurs when a thin fingerprint contact medium is used, and to form a lens system comprised of a cylindrical lens and a spherical lens for adjustment of a ratio of transversal to longitudinal widths of an image.

10 Claims, 14 Drawing Sheets

OPTICAL FINGER PRINT INPUT DEVICE FOR MOBILE APPARATUS

FIELD OF THE INVENTION

The present invention relates to an optical fingerprint input device capable of being applied to a mobile apparatus such as a cellular phone and the like and, more particularly, to a thin optical fingerprint input device capable of obtaining high-resolution fingerprint information without any image distortion.

BACKGROUND OF THE INVENTION

In general, there are three methods of obtaining fingerprint information from human beings, namely, indirect method, optical method and non-optical method. The indirect method involves the use of scanners or cameras for scanning or photographing fingerprints printed on a paper, and the non-optical method utilizes the principle of electric field.

Figure 1:
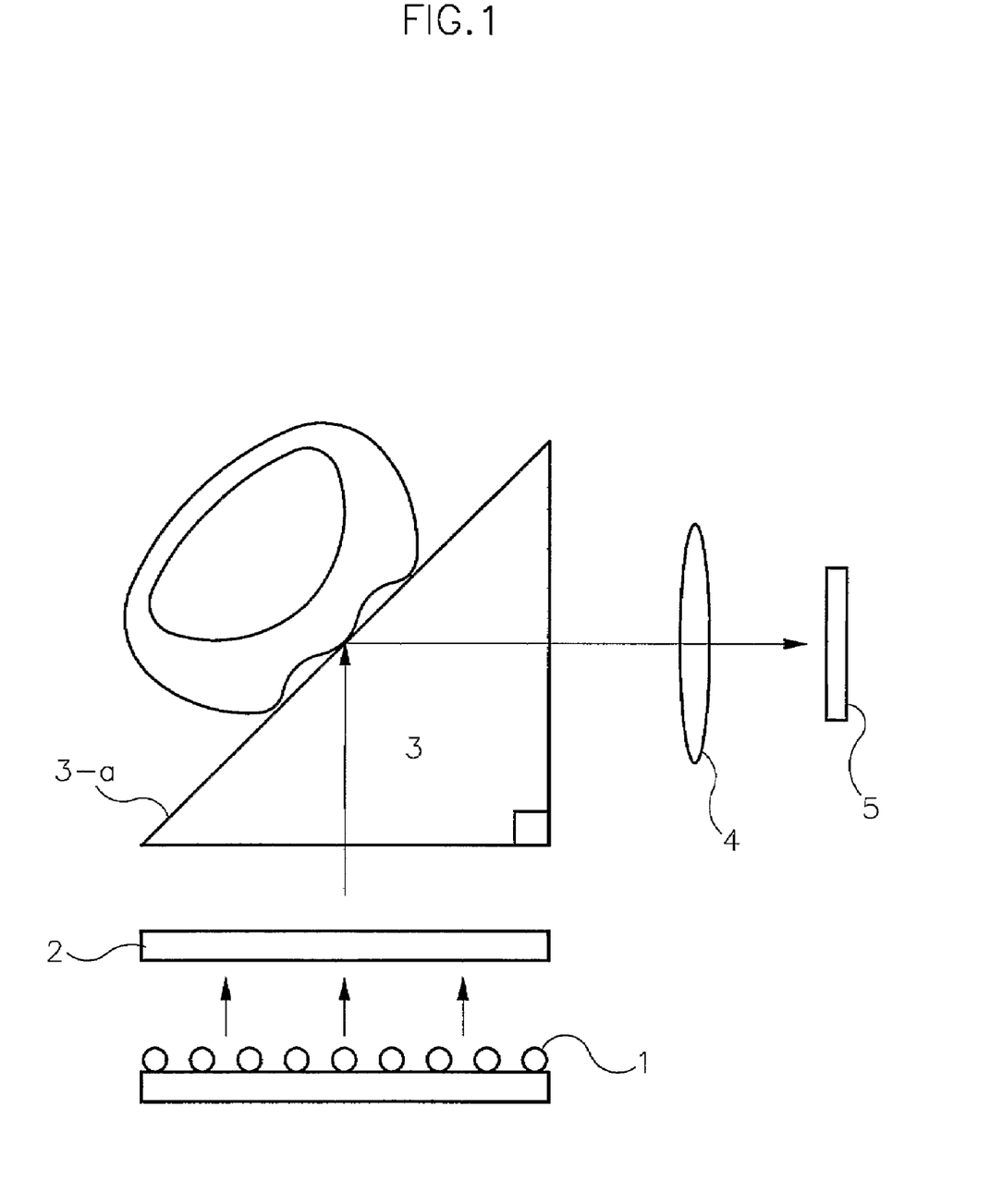
FIG. 1 is a schematic block diagram for illustrating an optical fingerprint input device according to the prior art.

The most efficient and common method is the optical method. As shown in FIG. 1, an apparatus for optically inputting fingerprints includes a light source (1) for illuminating light on a fingerprint region, a diffusing plate (2) for diffusing light generated from the light source (1), a prism (3), a lens (4) for forming a fingerprint image to be formed on a fingerprint capturing surface (3-a) of the prism (3), and an image sensor (5) for converting the fingerprint image formed on the lens (4) to an electrical signal.

In the optical fingerprint input apparatus thus described, when the fingerprint region touches the fingerprint capturing surface (3-a) of the prism (3), light beams from the light source (1) are reflected from and absorbed in the ridge lines and valleys, where the reflected light beams are incident on the prism (3), images of which are formed on the lens (4), and the light beams having their images formed on the lens (4) are incident on the image sensor (5) to allow the images of the fingerprint to be inputted.

However, there is a drawback in the optical fingerprint input apparatus thus described according to the prior art in that miniaturization of the apparatus is restricted by the thickness of the lens, making it difficult to be integrated with other apparatus.

In order to cope with the above-mentioned drawback, a prism is thinned to form a thin plate. However there arises another drawback in that an angle of an inclined surface becomes larger as the thickness of prism is thinned to proportionally produce a worsened trapezoidal distortion of the fingerprint images, making it impossible to be applied to mobile apparatus where a thin-light-miniaturized look is valued high as in cellular phones.

There is still another drawback in that oil from a human's hand or face can stain a fingerprint contact region of an optical fingerprint input apparatus when the apparatus is applied to a cellular phone, making it difficult to distinguish between oil information and fingerprint information and to verify fingerprints.

SUMMARY OF THE INVENTION

The present invention is disclosed to solve the aforementioned drawbacks and it is an object of the present invention to provide an optical fingerprint input device for a mobile apparatus configured to be thinned in thickness thereof and to be capable of removing oil and sweat therefrom such that distortion of fingerprint images can be avoided for an easy application to a mobile apparatus.

In accordance with a preferred embodiment of the present invention, the optical fingerprint input device for a mobile apparatus comprises: a fingerprint input member made of a thin plate-shaped and light-penetrative material, and formed thereon with an incident surface for receiving fingerprint images and an inclined surface at one side contacting the incident surface; a distortion correcting member made of a box-shaped and light penetrative material and disposed with an incident surface opposite to the inclined surface of the fingerprint input member and an inclined surface oppositely formed to the incident surface of the distortion correcting member and reversely inclined relative to the inclined surface of the fingerprint input member; an image forming unit for forming fingerprint images penetratively reflected from the inclined surface of the distortion correcting member; and an image sensor for receiving the fingerprint images formed by the image forming unit to generate a signal corresponding to the input images.

Preferably, the image forming unit includes a cylindrical lens for shrinking and enlarging a length in any one direction of an image and a spherical lens for forming images.

Preferably, the fingerprint input member is disposed on top of a liquid crystal display element of a mobile apparatus so as to be integrated with a display device of the mobile apparatus, such that a back light module for the liquid crystal display element can be commonly used as a light source for the fingerprint input member and the display device of the mobile apparatus.

Preferably, the optical fingerprint input device for a mobile apparatus further comprises: a reflecting member for blocking fingerprint images penetratively coming from the image forming unit and allowing other images inputted from the other side of a mobile apparatus to be inputted into the image sensor; and moving means for moving the reflecting member according to a user's choice between a point where a light path between the image forming unit and the image sensor is blocked and a point where the light path is not blocked, such that one image sensor can be commonly used for a fingerprint input device and a camera for a mobile apparatus.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENT

The preferred embodiments of the present invention will now be described in detail with reference to the annexed drawings, where the present embodiments are not limiting the scope of the present invention but is given only as an illustrative purpose.

First Embodiment

Figure 2:
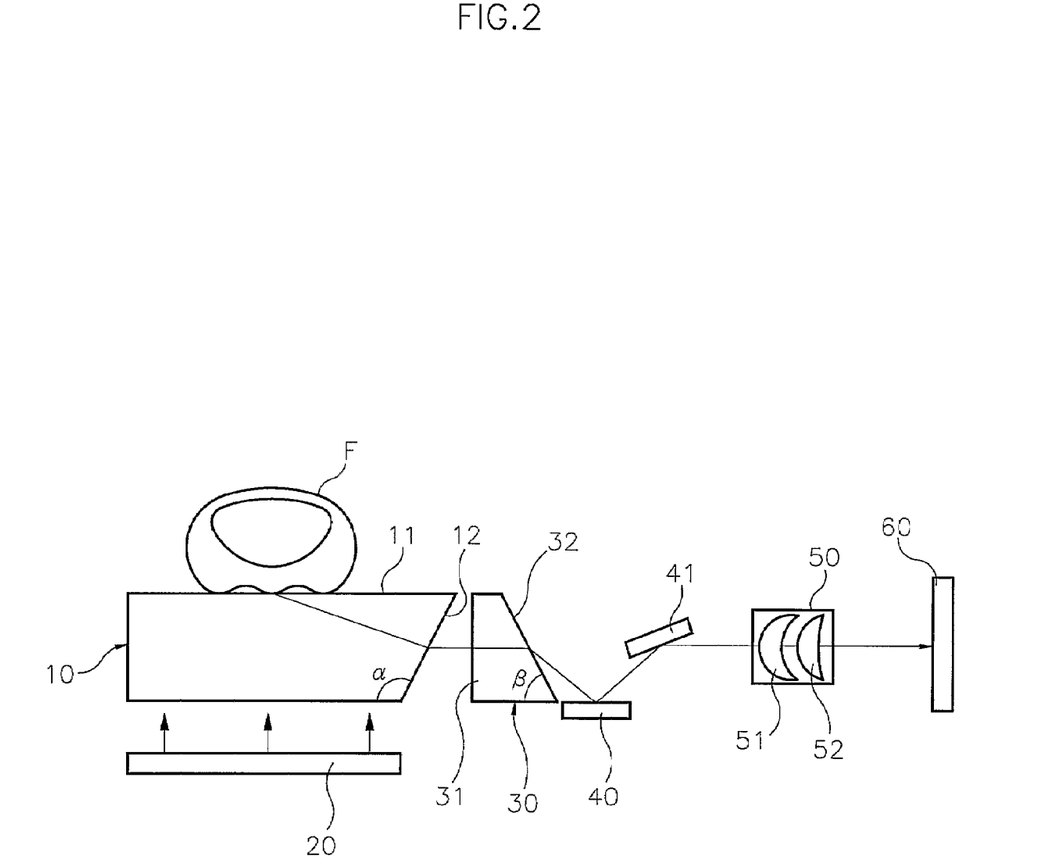
FIG. 2 is a schematic block diagram for illustrating an optical fingerprint input device for a mobile apparatus according to a first embodiment of the present invention.

Referring to FIG. 2, the optical fingerprint input device for a mobile apparatus includes a fingerprint input member (10), a light source (20), a distortion correcting member (30), first and second reflecting members (40, 41), an image forming unit (50) and an image sensor (60).

The fingerprint input member (10) made of a thin plate-shaped light-penetrative material such as glass, plastic or the like, is formed thereon with an incident surface (11) for receiving fingerprint images of a finger (F) and an inclined surface (12) disposed at one side thereof contacting the incident surface (11) with a first set-up angle ($\alpha$). The first set-up angle ($\alpha$) at the inclined surface (12) of the fingerprint input member (10) is so set up as to display only a genuine fingerprint image devoid of sweat, water, oil or the like.

The light source (20) serves to evenly illuminate beam lights toward the incident surface (11) of the fingerprint input member (10). A back light module used for a liquid crystal display element in the mobile apparatus may be used as the light source (20). In other words, the fingerprint input member (10) is disposed on top of a liquid crystal display element of the mobile apparatus to be integrated with a display device of the mobile apparatus, such that a back light module for a liquid crystal display element may be commonly used as a light source for the fingerprint input member and the display device of the mobile apparatus.

Figure 3:
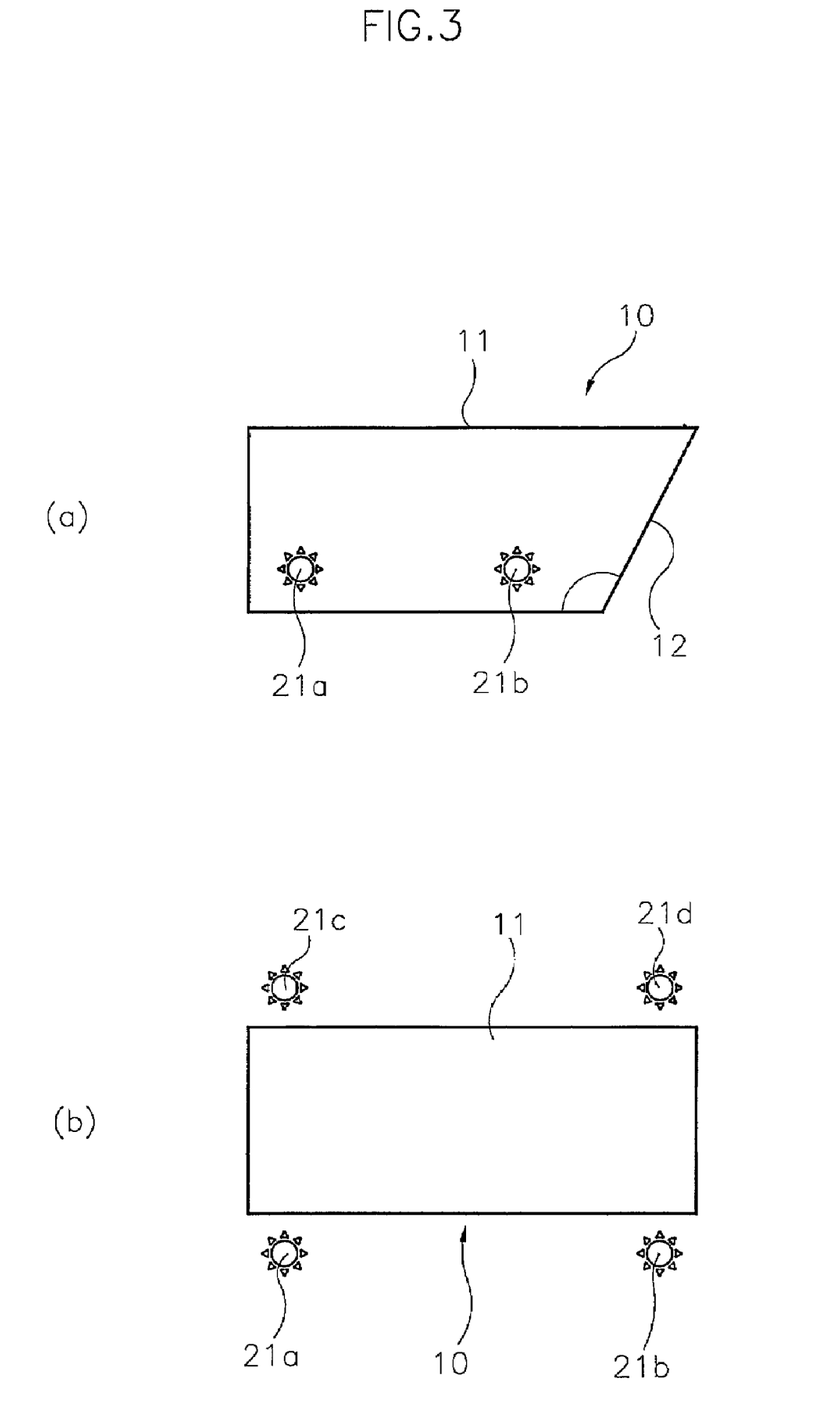
FIGS. 3a and 3b are schematic drawings for explaining other examples of arranging a light source relative to a fingerprint input member illustrated in FIG. 2.

As shown in FIGS. 3a and 3b, a plurality of spot light sources (21a-21d) may be used separately from the back light module by being arranged on both sides of the fingerprint input member (10).

The distortion correcting member (30) is made of a box-shaped and light penetrative material such as glass, plastic or the like, and disposed with an incident surface (31) opposite to the inclined surface (12) of the fingerprint input member (10) and an inclined surface (32) formed opposite to the incident surface (31) at a second set-up angle ($\beta$). An inclined direction at the inclined surface (32) of the distortion correcting member (30) is reversely formed relative to the an inclined direction of the inclined surface (12) of the fingerprint input member (10) to thereby enable to correct a trapezoidal distortion of fingerprint images penetratively coming from the inclined surface (12) of the fingerprint input member (10).

The first and second reflecting members (41, 42) serve to convert the advancing direction of the fingerprint images or light beams reflected from the inclined surface (32) of the distortion correcting member (30).

The image-forming unit (50) modularizes a cylindrical lens (51) for shrinking and enlarging a length in any one direction of an image and a spherical lens (52) for forming images.

For reference, the cylindrical lens (51) is obtained by cutting a cylindrical lens in its longitudinal direction and can shrink or enlarge a length in any one direction of an image according to arranged directions thereof. In the present invention, a cylindrical lens (51) is arranged for transversely shrinking a fingerprint image penetratively coming from the distortion correcting member (30) and for longitudinally enlarging a fingerprint image.

In other words, a fingerprint of a finger is wider in its transverse direction and narrower in its longitudinal direction, such that if a fingerprint having different widths between in its transverse and longitudinal directions is inputted into the image sensor (60) as is, there is generated an open space where a fingerprint image of longitudinal direction is not inputted on an image-forming surface of the image sensor (60). The open space formed on the image-forming surface of the image sensor (60) is an unused space, and in most cases, the image sensor (60) is made of semiconductor elements and the unused image forming surface of the image sensor (60) is a great loss in view of high production cost of semiconductor elements per area.

Meanwhile, when a fingerprint image having different widths between in its transverse and longitudinal directions is inputted into the image sensor (60) as is, the number of pixels on the image sensor for accepting fingerprint information region are reduced to thereby decrease a resolving power of the fingerprint information.

In order to cope with the aforementioned drawbacks, the cylindrical lens (51) is used for the present invention to transversely shrink a fingerprint image or longitudinally enlarge a fingerprint image in order to allow the entire fingerprint image to be inputted into the image forming surface of the image sensor (60) without the open space thereon.

The image sensor (60) receives fingerprint images formed by the image-forming unit (50) to generate and output signals corresponding to the input images. For example, the image sensor (60) may be an image pickup device of complementary metal-oxide-semiconductor (CMOS) type, or a charge coupled device (CCD) or the like, where an image pickup device of CMOS type is preferred.

An operating principle of sweat, water or oil being discriminated by the fingerprint input member (10) will now be explained.

Figure 4:
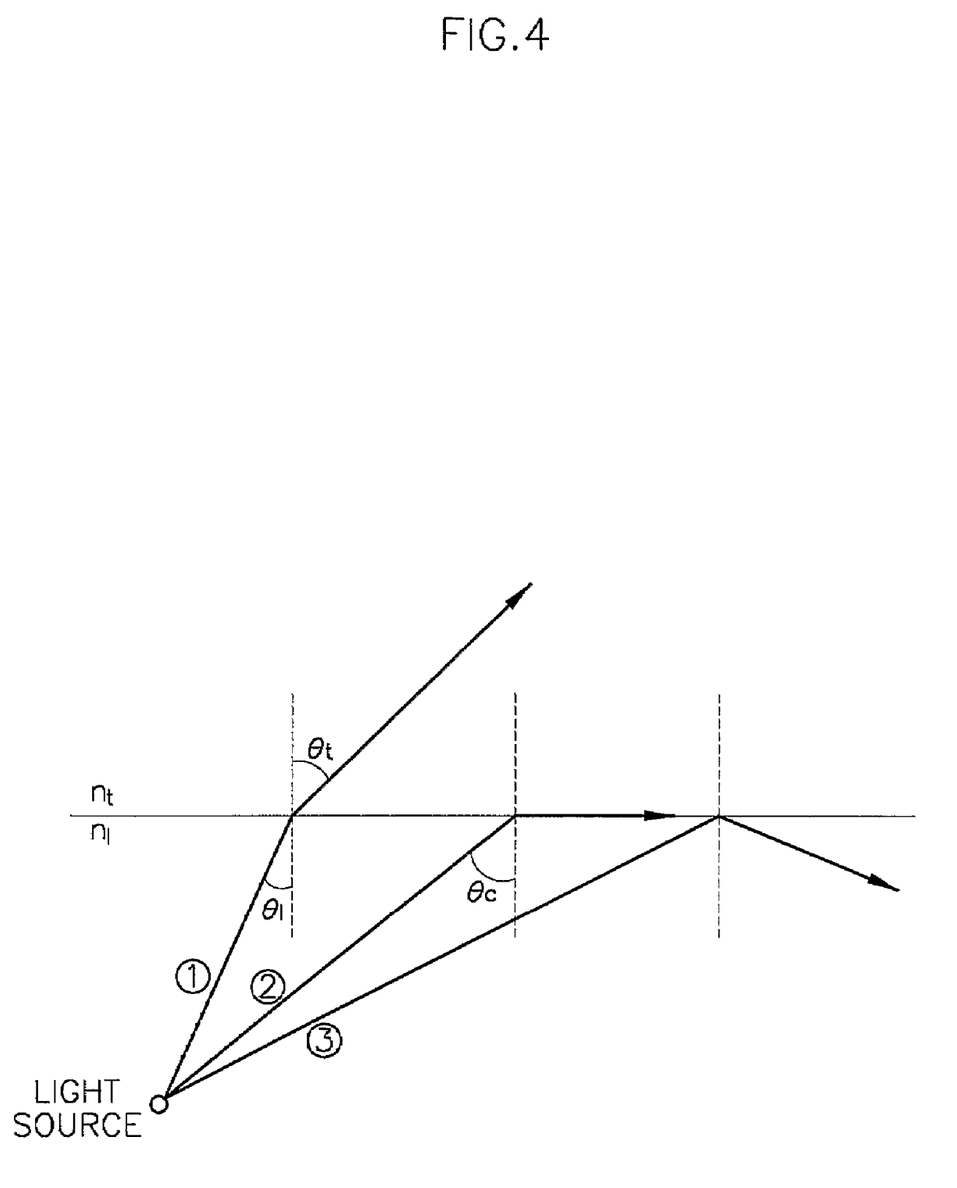
FIG. 4 is a schematic drawing for explaining a refractive phenomenon of beam lights occurring on boundary surfaces of different media.

Referring to FIG. 4, a light beam is refracted and advances along a first light path (1) when a refractive index of a medium on which the light beam is incident is larger than that of a medium through which the light beam penetrates. However, when an incident angle ($\theta_i$) exceeds a certain degree, no light beams penetrate through outside a medium, the phenomenon of which is referred to as total internal reflection and the angle under this circumstance is referred to as critical angle, which is determined by refractive indexes of two media comprising a boundary surface therebetween.

The critical angle is an incident angle ($\theta_i$) when $\theta_t$ is 90 degrees, and can be applied according to Snell's law provided in Formula 1.

$n_i \sin \theta_i = n_t \sin \theta_t$ : Snell's law <FORMULA 1> where, $n_i$ is a refractive index of an incident medium, $n_t$ is a refractive index of penetrated medium, $\theta_i$ an incident angle and $\theta_t$ is a penetration angle (or angle of refraction). In other words, the travel of light beam in media of different refractive indexes is determined by a maximum angle thereof according to Snell's law.

Figure 5:
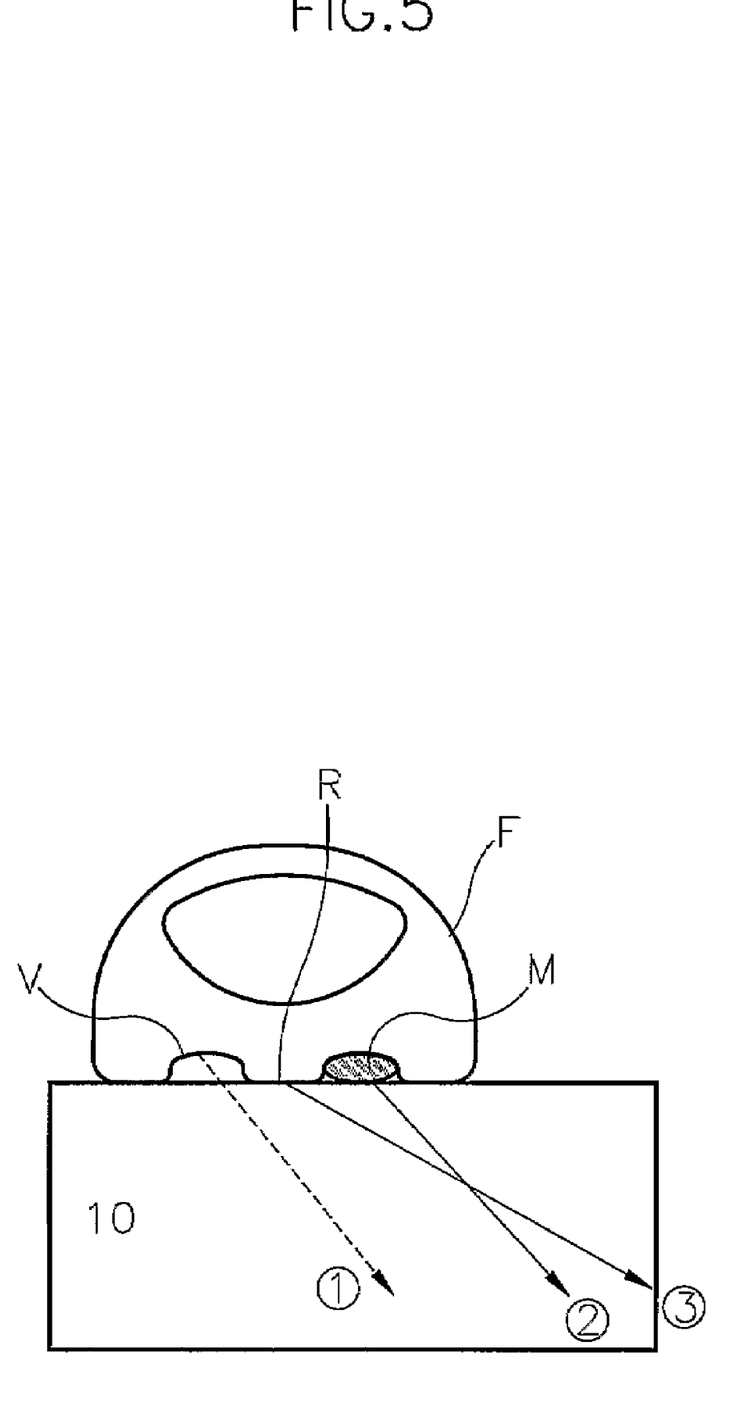
FIG. 5 is a schematic drawing for explaining a principle of how oil, water and sweat are distinguished.

When a finger tip smeared with sweat, oil or the like contacts a fingerprint contact medium as illustrated in FIG. 5, there is no reflection of light beams from valleys (V) of a fingerprint while light beams are reflected from ridge lines (R), and fingerprint information is progressed along a third light path (③). Furthermore, a light beam reflected from sweat or oil (M) progresses to a second light path (②) according to Snell's law where the light beam having a larger angle than that of the second light path (②) cannot progress. As a result, if only the fingerprint information progressing along the third light path (③) is accepted, residual images caused by sweat or oil can be removed. The set-up angle (α) at the inclined surface (12) side of the fingerprint input member (10) is therefore so established as to allow only the fingerprint information following the third light path (③) to be incident on the image sensor.

An operating principle of how fingerprint images trapezoidally distorted by the fingerprint input member (10) are corrected by the distortion correcting member (30) will now be explained.

Figure 6:
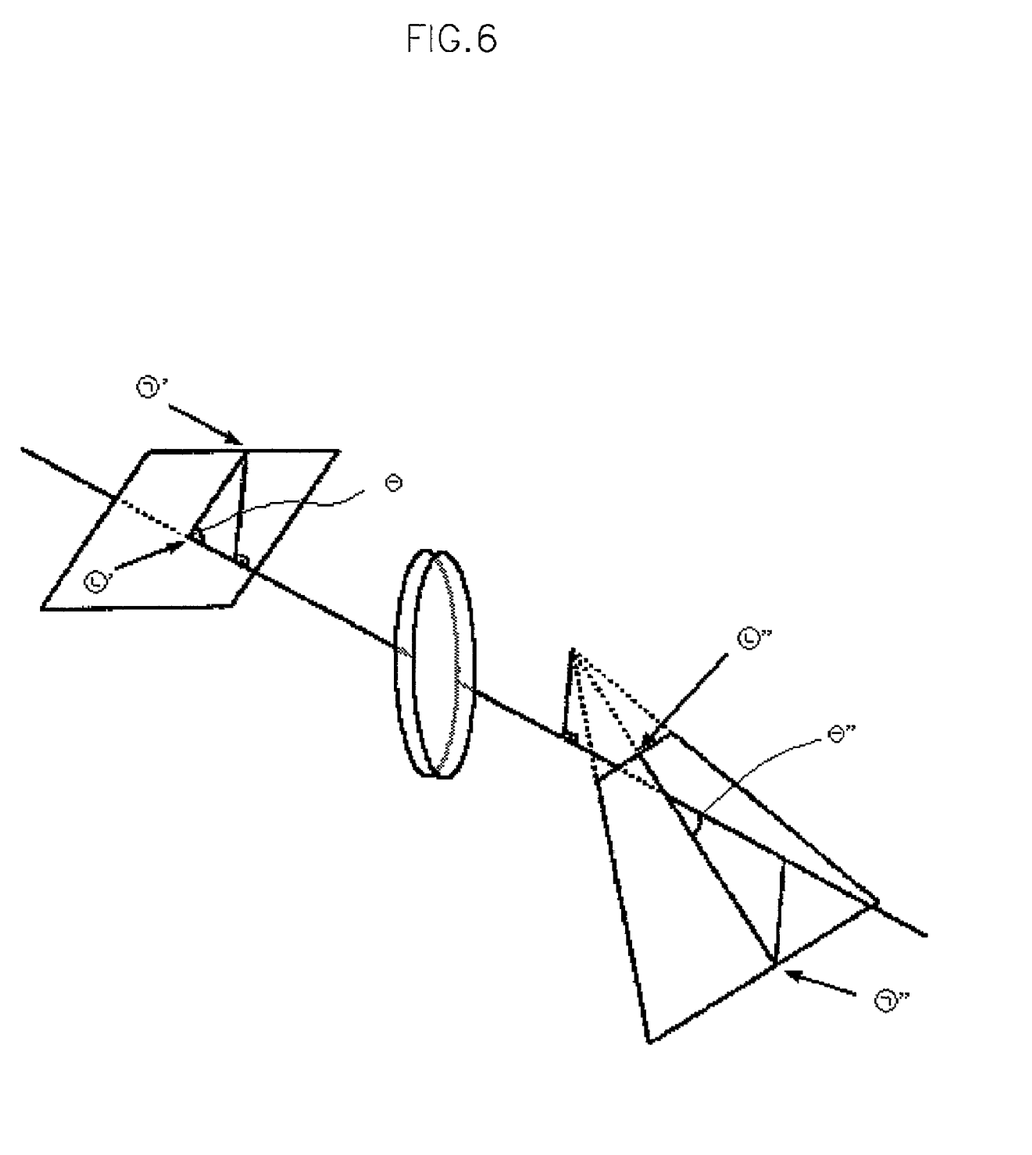
FIG. 6 is a schematic drawing for explaining the cause of a trapezoidal distortion occurrence.

Referring now to FIG. 6, when segments of a line (Θ' Θ') of an object are different in lengths thereof from a lens relative to an optical axis, images having passed the lens become segments of a line (Θ" Θ") and form an image of trapezoidal distortion. The trapezoidal distortion becomes larger as an angle formed by an object and the optical axis becomes smaller. In other words, in order to thin the thickness of the fingerprint input member (10), said angle must be smaller and the trapezoidal distortion becomes as large as said angle becomes smaller, and as a result, there is generated a long trapezoidal image having a longer transverse length compared with a longitudinal length.

The trapezoidal distortion of the fingerprint is corrected by passing through the distortion correcting member (30), the principle of which is explained below.

Figure 7:
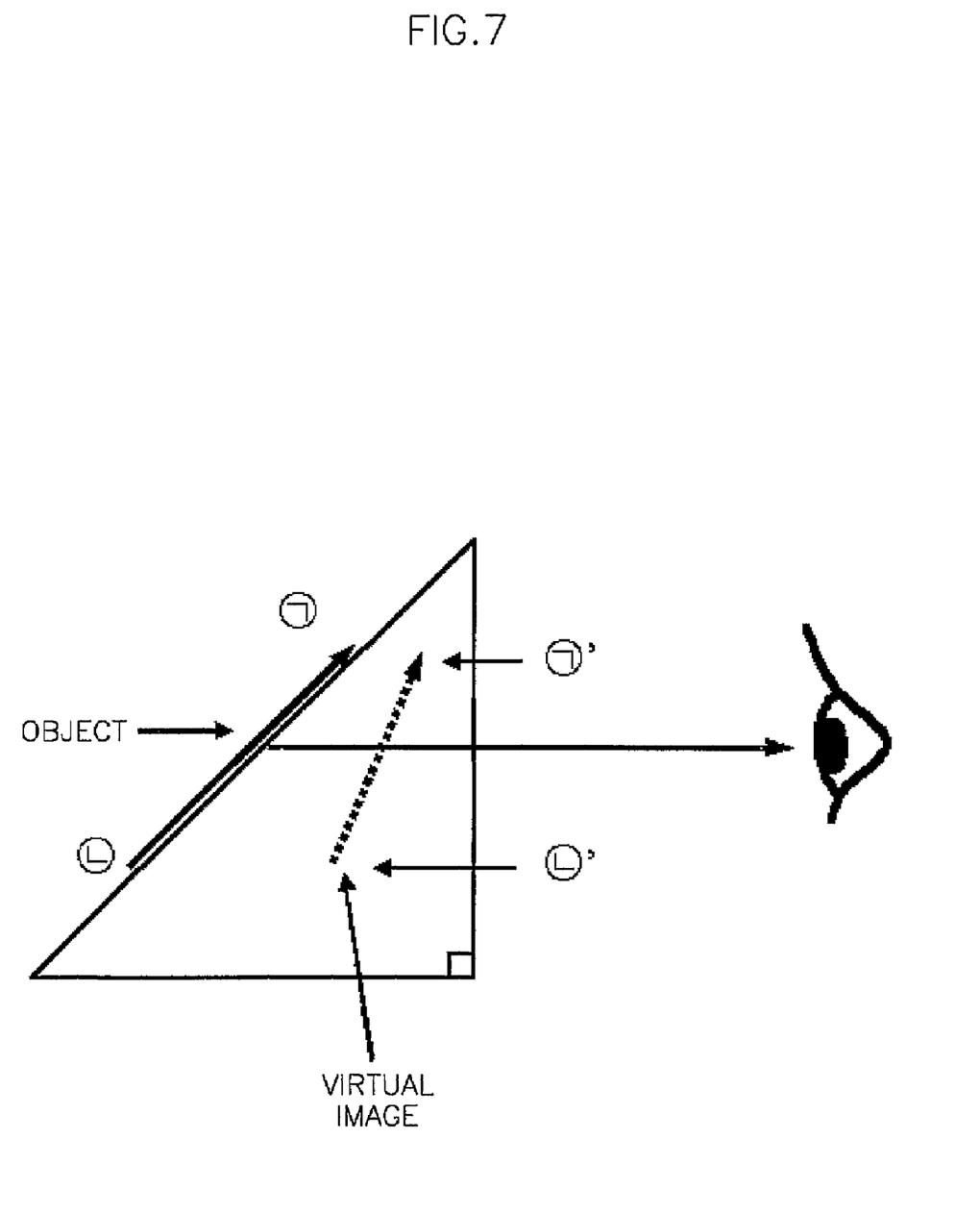
FIG. 7 is a schematic drawing for explaining a virtual image occurring in a prism.

Referring to FIG. 7, segments of a line (Θ Θ) of an object located on an incident surface of the fingerprint input member appear to an observer as being located on segments of a line (Θ' Θ'), where an object formed in a prism is called a virtual image.

Figure 8:
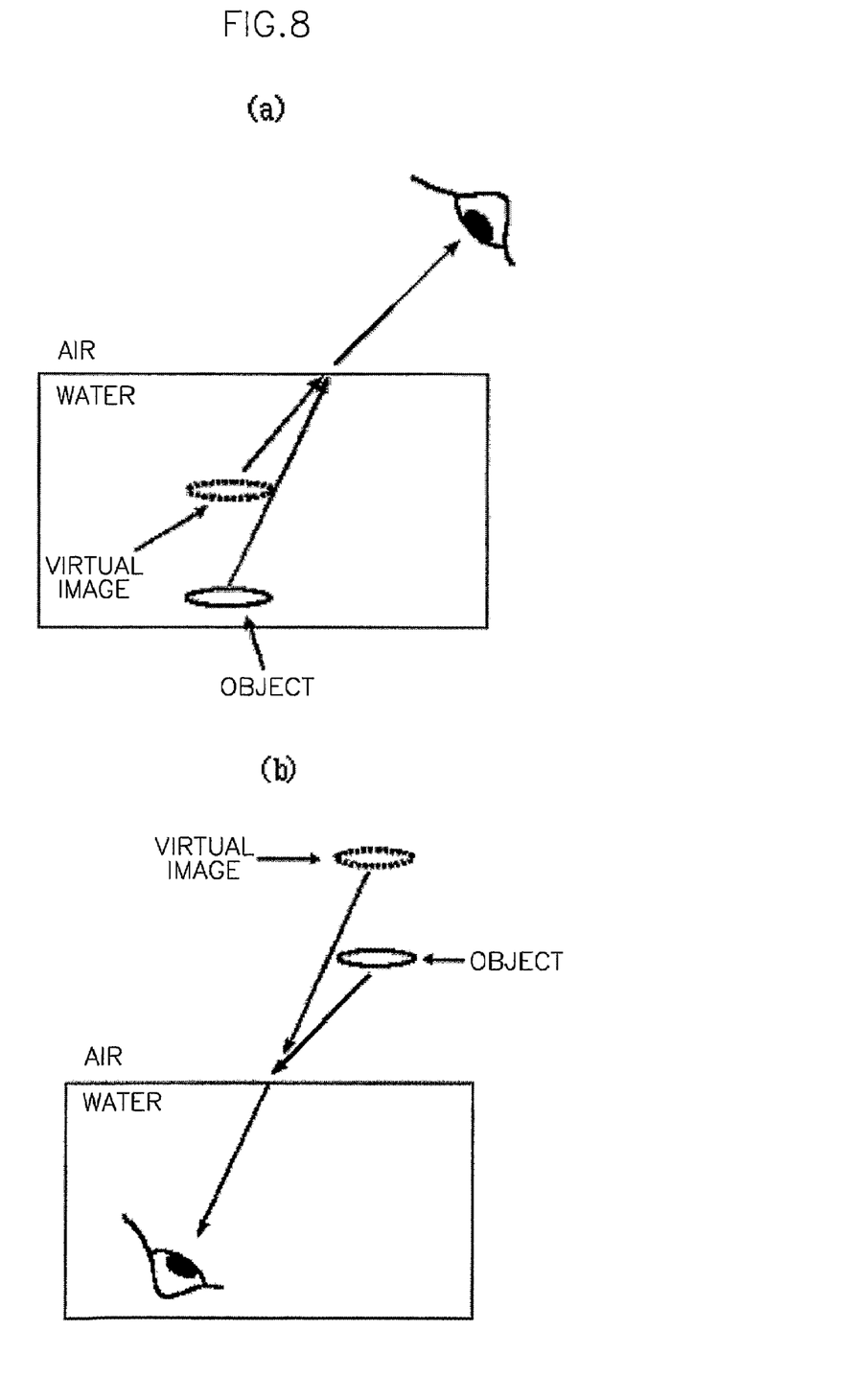
FIGS. 8a and 8b are schematic drawings each for explaining the cause of a virtual image occurrence.

The position of a virtual image of an object will now be explained when the object is located in water.

When an object is situated in water as shown in FIGS. 8a and 8b, and an observer is viewing the object from outside of the water, the object appears as being located higher than its actual position, and adversely, the object in the air as seen from the water appears as being located far away from its actual position.

Furthermore, the position of an object is affected by an angle between an observer and a surface of the water, and refractive indexes of two media. With these points under consideration, a trapezoidal distortion can be corrected according to establishment of thickness of the distortion correcting member (30), the angle and the refractive indexes.

The position of a virtual image can be determined by the following. An object (Q) positioned at a depth of s from a boundary surface of medium (see FIG. 9) appears to an observer situated outside of the boundary surface as being situated at a position of s'. When an angle formed by a refracted light path and an optical axis is referred to as φ, and an angle formed by a light path of the virtual image (Q') and an optical axis is referred to as φ', the position of the virtual image can be obtained by the following Formula 2.

Figure 9:
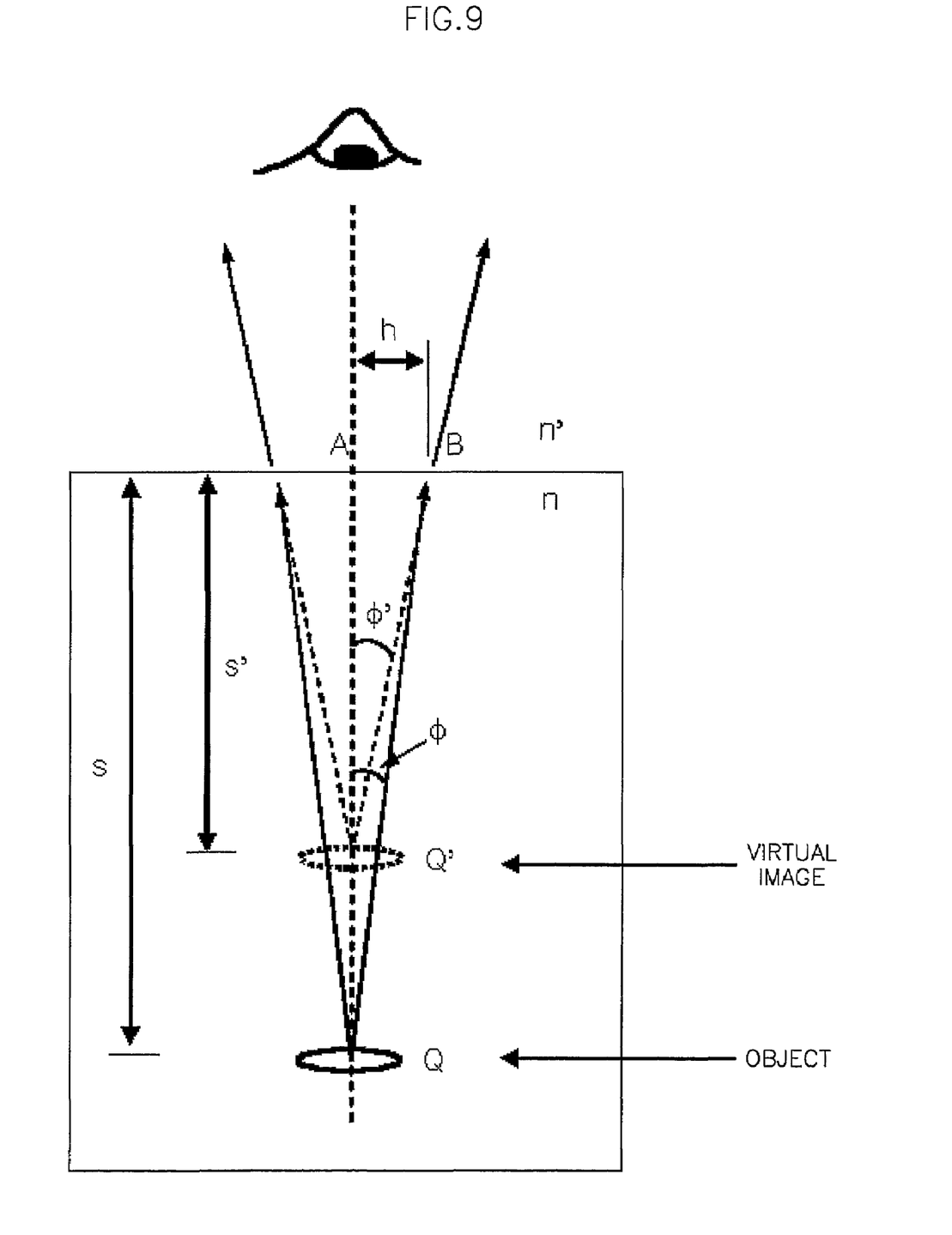
FIG. 9 is a schematic drawing for explaining a principle of how a virtual image occurs.

< FORMULA 2 >

$$h = s\tan\varphi = s'\tan\varphi'$$
$$s' = s\frac{\tan\varphi}{\tan\varphi'} = s\frac{\sin\varphi\cos\varphi'}{\cos\varphi\sin\varphi'}$$
$$\frac{\sin\varphi}{\sin\varphi'} = \frac{n'}{n} : \text{Snell's law}$$

(1)

If Snell's Law is put into (1) of Formula 2, Formula 3 can be induced where a distance (s') between the virtual image (Q) and the boundary surface of the medium can be derived as per Formula 3.

< FORMULA 3 >

$$s' = s\frac{n'}{n}\frac{\cos\varphi'}{\cos\varphi}$$

According to the principle thus described, a surface onto which a fingerprint image is incident, i.e., the incident surface (11) of the fingerprint input member (10) can eliminate the trapezoidal distortion even though the incident surface is not placed on the light axis perpendicular to the image sensor (60) because considering refractive index of the distortion correcting member (30) and the position of the virtual image, an inclined angle (β) relative to the inclined surface (32) of the distortion correcting member (30) is set up and, as a result the virtual image of the fingerprint image becomes placed perpendicular to the light axis.

Figure 10:
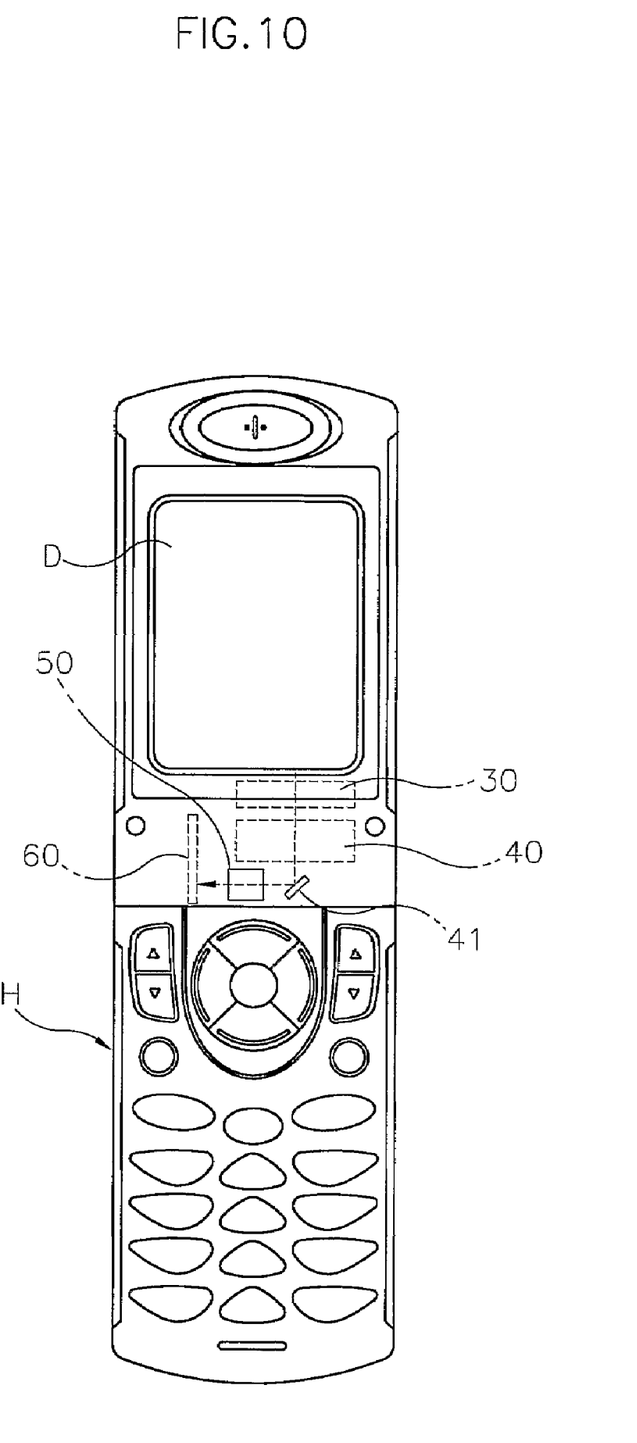
FIG. 10 is a schematic drawing for illustrating an example of an optical fingerprint input device of FIG. 2 applied to a cellular phone.

FIG. 10 is a schematic drawing for illustrating an example of an optical fingerprint input device of FIG. 2 applied to a cellular phone.

Referring now to FIG. 10, the fingerprint input member (10), the light source (20), the distortion correcting member (30), the first and second reflecting members (40,41), the image forming unit (50) and the image sensor (60) are mounted inside a body of a cellular phone (H) while the fingerprint input member (10) is disposed on top of the liquid crystal display element of the cellular phone (H), such that a back light module for a liquid crystal display element can be commonly used as a light source, and the fingerprint input member (10) can be also used as a protective window of the liquid crystal display element, even though a protective window of the liquid crystal display element is not separately installed.

Figure 11:
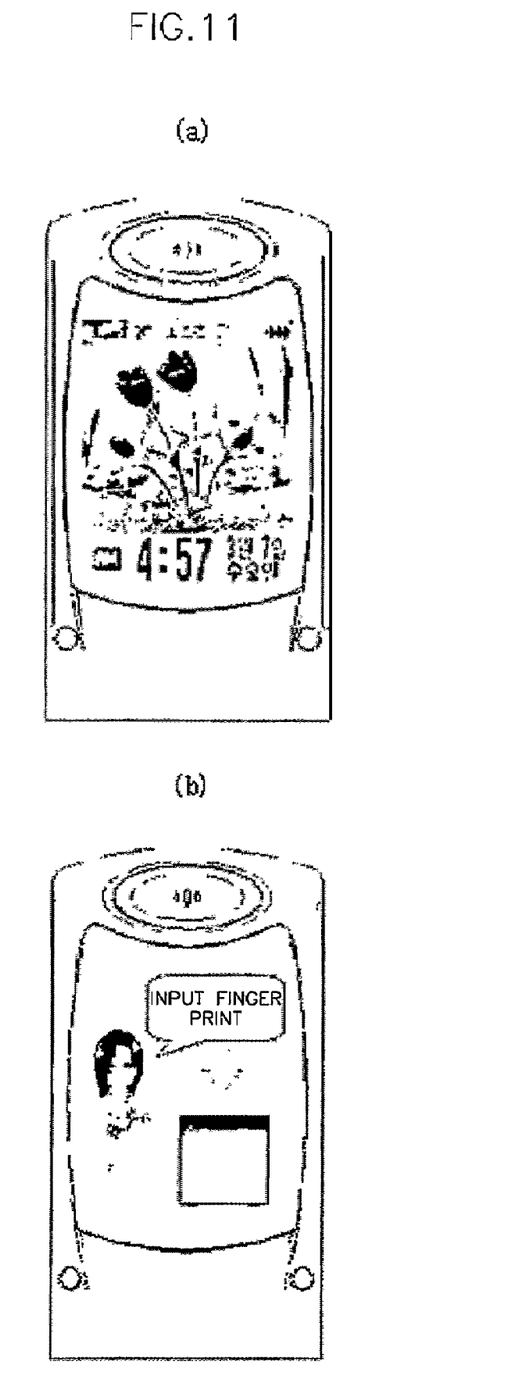
FIGS. 11a and 11b are exemplary drawings for illustrating an embodiment of an intrinsic display function and a fingerprint input function of a cellular phone via a liquid crystal display device of FIG. 10.

For example, under normal circumstances where the fingerprint input function is not used, general functions of a cellular phone are displayed via the liquid crystal display element of the cellular phone (H) as illustrated in FIG. 11a, and when the fingerprint input functions are supposed to be used as illustrated in FIG. 11b, a fingerprint input window (FIW) corresponding to a region for receiving fingerprints of the fingerprint input member (10) is displayed on the liquid crystal display element to guide a fingerprint region of a finger (F) thereon.

The fingerprint input window (FIW) can be variably designated in positions thereof, i.e., on a left lower end, right lower end, middle section, left upper end, right upper end or other sections in an area of the fingerprint input member (10)

according to installment positions of the distortion correcting member (30) and the first and second reflecting members (40,41).

As mentioned above, there is an advantage in that when the fingerprint input member (10) is integrally disposed on top of the liquid crystal display element, there is no way of knowing from the outside that a fingerprint input device is intrinsically disposed therein to increase a secrecy of installment of the fingerprint input device.

Second Embodiment

Meanwhile, referring to FIGS. 12a and 12b, and FIGS. 13a and 13b, an optical fingerprint contact device for a mobile apparatus according to a second embodiment of the present invention is illustrated, which is an application of the optical fingerprint input device for a mobile apparatus according to the first embodiment of the present invention illustrated in FIG. 2.

A camera function of a cellular phone and a fingerprint input function of a fingerprint input device are commonly utilized via a single image sensor (60) in the optical fingerprint contact device for a mobile apparatus according to the second embodiment of the present invention.

In other words, the optical fingerprint contact device according to the second embodiment of the present invention further includes, between the image forming unit (50) and the image sensor (60), an image input module (100) for a camera phone, and moving means for moving the image input module (100) according to a user's choice between a point for blocking a light path between the image forming unit (50) and the image sensor (60) and a point for not blocking the light path.

The image input module (100) has integrated a reflecting member (110) for converting a path of an image (AI) inputted from other direction than that of an image from the fingerprint input member (10) and a lens module (120) for forming images. Under normal circumstances, the image input module (100) is positioned at a point where a light path between the image forming unit (50) and the image sensor (60) is not blocked.

Under this circumstance, when a user manipulates a key panel of a cellular phone (H) for using a camera phone, the image input module (100) is moved by the moving means to a point for blocking a light path between the image forming unit (50) and the image sensor (60), as illustrated in FIGS. 12a and 12b, and the image (AI) inputted from a direction different from that of the image from the fingerprint input member (10) is inputted to the image sensor (60) via the image input module (100). In other words, the image sensor (60) is used as a camera phone.

Third Embodiment

Figure 14:
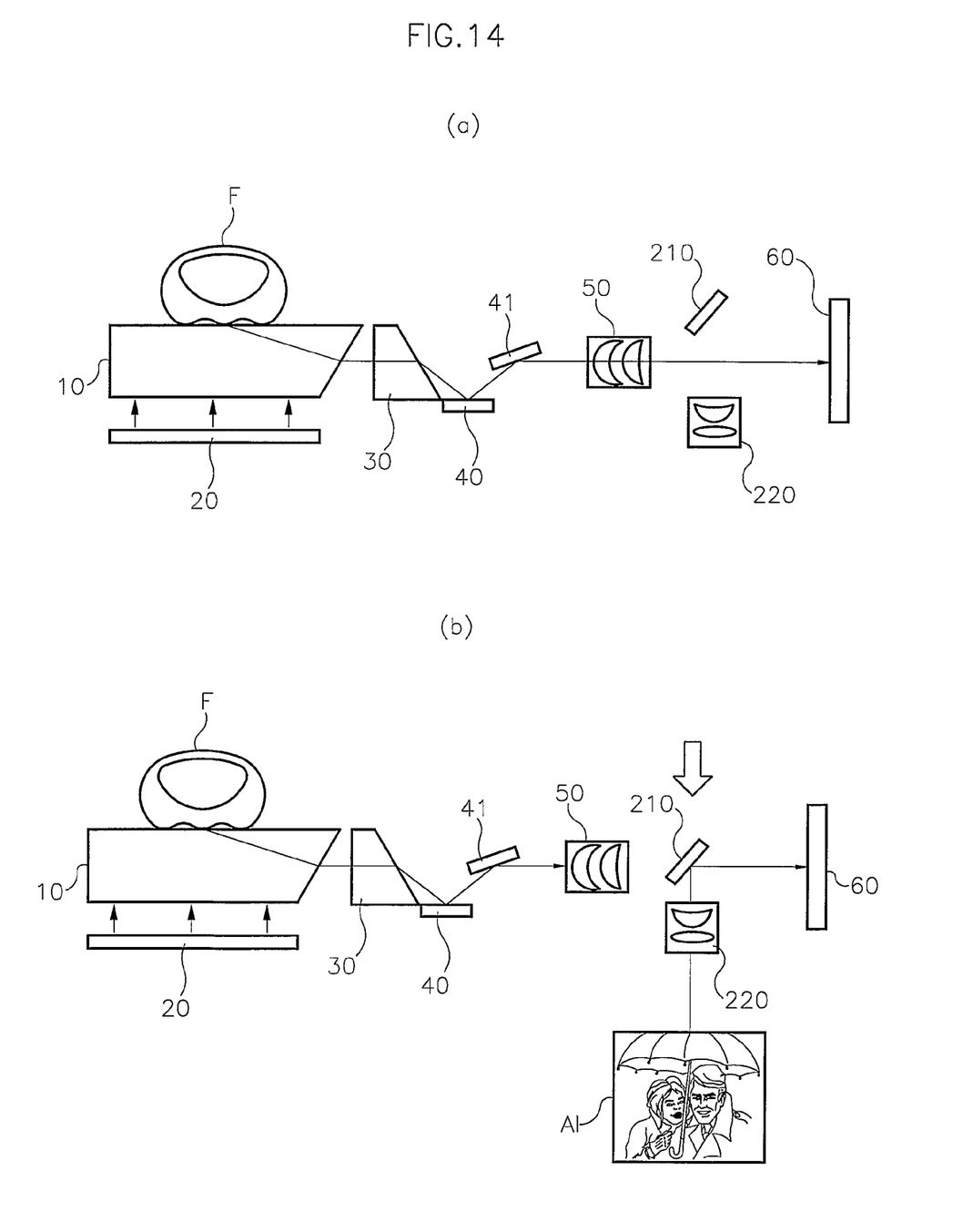
FIGS. 14a and 14b are schematic drawings for illustrating an optical fingerprint contact device for a mobile apparatus according to a third embodiment of the present invention.

Referring now to FIGS. 14a and 14b, an optical fingerprint contact device for a mobile apparatus according to a third embodiment of the present invention is disclosed.

Figure 12:
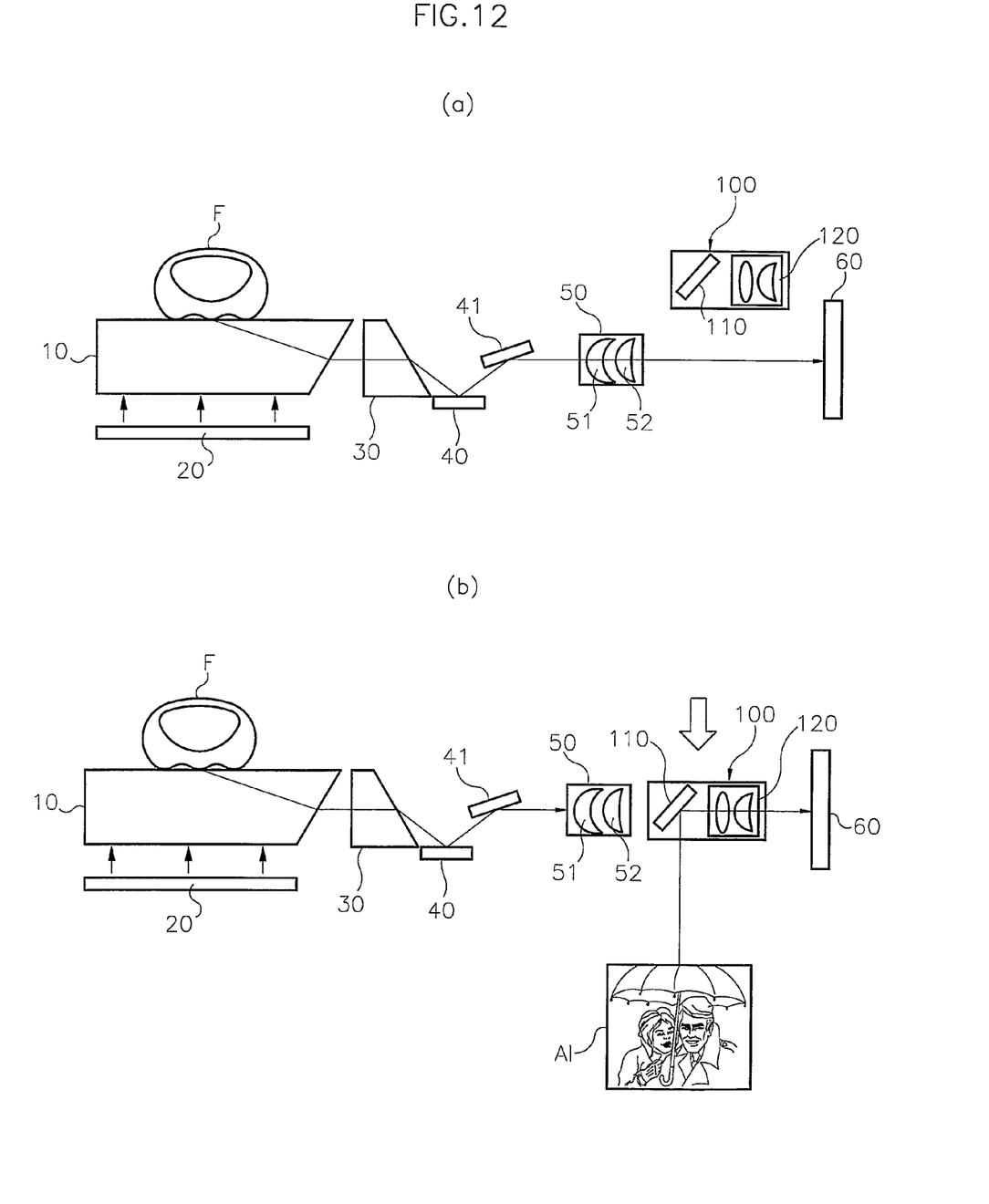
FIGS. 12a and 12b are schematic drawings for illustrating an optical fingerprint contact device for a mobile apparatus according to a second embodiment of the present invention.
Figure 13:
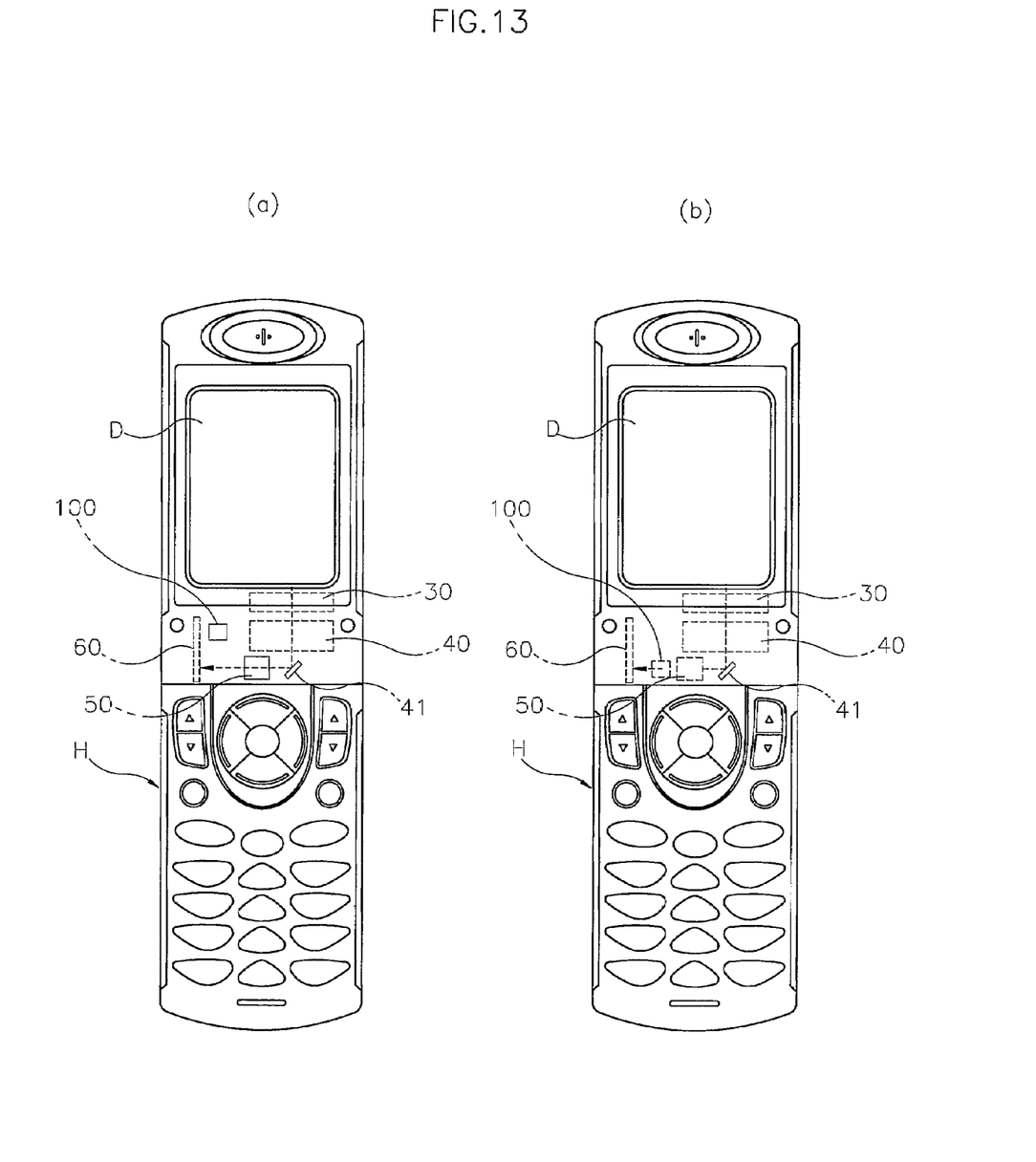
FIGS. 13a and 13b are schematic drawings for illustrating a state where the optical fingerprint contact device of FIGS. 12a and 12b is applied to a cellular phone.

As in the second embodiment illustrated in FIGS. 12 and 13, a camera function of a cellular phone and a fingerprint input function of a fingerprint input device are commonly utilized via a single image sensor (60) in the optical fingerprint contact device for a mobile apparatus according to the third embodiment of the present invention. The only difference is that a reflecting member (210) for a camera phone and a lens module (220) for a camera phone are separately provided, where the lens module (220) is fixed while the reflecting member (210) can be moved by moving means.

The foregoing description of the preferred embodiments of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto, and their equivalents.

As apparent from the foregoing, there is an advantage in the optical fingerprint input device for a mobile apparatus thus described according to the embodiments of the present invention in that a fingerprint contact member and a distortion correcting member, each having a different set-up inclined angle, are separately provided to correct a trapezoidal distortion generated by a thin optical fingerprint input device, and a lens system including a cylindrical lens and a spherical lens is formed to adjust a ratio of transverse to longitudinal widths of an image, such that only a fingerprint image devoid of sweat, water or oil smeared on a fingerprint contact surface when a cellular phone is applied can be obtained via a set-up angle of the fingerprint contact member.

There is another advantage in that a disadvantage of a thin optical fingerprint input device can be overcome to minimize the loss of information necessary for fingerprint verification, and a region of a used image sensor can be established in consideration of a design to be capable of obtaining fingerprint information of a high resolution.

There is still another advantage in that, as the thin optical fingerprint input device can be embodied, the present invention can be applied to a mobile apparatus like a cellular phone, and a conventional secrecy-maintaining function performed by a secret number can be replaced by fingerprint information to thereby increase the secrecy of the mobile apparatus.

There is still further advantage in that a single image sensor is utilized for application to both a fingerprint input device and a camera phone to thereby reduce the size of a camera phone and to simplify the construction thereof.

What is claimed:

1. An optical fingerprint input device for a mobile apparatus comprising:
    a fingerprint input member made of a thin plate-shaped and light-penetrative material, and formed thereon with an incident surface for receiving fingerprint images and an inclined surface at one side contacting the incident surface;
    a distortion correcting member made of a box-shaped and light penetrative material and disposed with an incident surface opposite to the inclined surface of said fingerprint input member and an inclined surface oppositely formed to the incident surface of said distortion correcting member and reversely inclined relative to the inclined surface of said fingerprint input member;
    an image-forming unit for forming fingerprint images penetratively reflected from the inclined surface of said distortion correcting member; and
    an image sensor for receiving the fingerprint images formed by said image forming unit to generate a signal corresponding to the input images.

2. The device as defined in claim 1, wherein the image-forming unit comprises:
    a cylindrical lens for shrinking and enlarging a length in any one direction of an image and a spherical lens for forming images.

3. The device as defined in claim 1, wherein the image forming unit further comprises means for converting directions of beam lights.

4. The device as defined in claim 1, wherein said fingerprint input member is disposed on top of a liquid crystal display element of a mobile apparatus so as to be integrated with a display device of the mobile apparatus, such that a back light module for the liquid crystal display element can be commonly used as a light source for the fingerprint input member and the display device of the mobile apparatus.

5. The device as defined in claim 1, wherein an angle of the inclined surface at said fingerprint input member is so established as to discriminate sweat, water or oil.

6. The device as defined in claim 1, further comprising:
a reflecting member for blocking fingerprint images penetratively coming from said image forming unit and for allowing other images coming from the other side of the mobile apparatus to be inputted in said image sensor; and
moving means for moving said reflecting member according to a user's choice between a point for blocking a light path between said image forming unit and said image sensor and a point for not blocking the light path, such that a single image sensor can be commonly utilized for both fingerprint input and camera phone of the mobile apparatus.

7. The device as defined in claim 6, wherein said reflecting member is integrally formed with a lens module for forming other images inputted from the other sides of the mobile apparatus to prompt said reflecting member and said lens module to be moved together by said moving means.

8. The device as defined in claim 2, further comprising:
a reflecting member for blocking fingerprint images penetratively coming from said image forming unit and for allowing other images coming from the other side of the mobile apparatus to be inputted in said image sensor; and
moving means for moving said reflecting member according to a user's choice between a point for blocking a light path between said image forming unit and said image sensor and a point for not blocking the light path, such that a single image sensor can be commonly utilized for both fingerprint input and camera phone of the mobile apparatus.

9. The device as defined in claim 3, further comprising:
a reflecting member for blocking fingerprint images penetratively coming from said image forming unit and for allowing other images coming from the other side of the mobile apparatus to be inputted in said image sensor; and
moving means for moving said reflecting member according to a user's choice between a point for blocking a light path between said image forming unit and said image sensor and a point for not blocking the light path, such that a single image sensor can be commonly utilized for both fingerprint input and camera phone of the mobile apparatus.

10. The device as defined in claim 4, further comprising:
a reflecting member for blocking fingerprint images penetratively coming from said image forming unit and for allowing other images coming from the other side of the mobile apparatus to be inputted in said image sensor; and
moving means for moving said reflecting member according to a user's choice between a point for blocking a light path between said image forming unit and said image sensor and a point for not blocking the light path, such that a single image sensor can be commonly utilized for both fingerprint input and camera phone of the mobile apparatus.

* * * * *